(12) United States Patent
Oshita et al.

(10) Patent No.: US 12,296,823 B2
(45) Date of Patent: May 13, 2025

(54) DRIVING SUPPORT METHOD, AND DRIVING SUPPORT DEVICE

(71) Applicant: Isuzu Motors Limited, Tokyo (JP)

(72) Inventors: Wasantha Oshita, Fujisawa (JP); Masaichi Takahashi, Fujisawa (JP); Shinichiro Fukazawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 226 days.

(21) Appl. No.: 17/801,538

(22) PCT Filed: Feb. 26, 2021

(86) PCT No.: PCT/JP2021/007386
§ 371 (c)(1),
(2) Date: Aug. 23, 2022

(87) PCT Pub. No.: WO2021/172518
PCT Pub. Date: Sep. 2, 2021

(65) Prior Publication Data
US 2023/0294694 A1    Sep. 21, 2023

(30) Foreign Application Priority Data

Feb. 28, 2020    (JP) ................................ 2020-033738

(51) Int. Cl.
*B60W 30/16*    (2020.01)
(52) U.S. Cl.
CPC ....... *B60W 30/16* (2013.01); *B60W 2520/105* (2013.01); *B60W 2552/00* (2020.02);
(Continued)

(58) Field of Classification Search
CPC .......... B60W 30/16; B60W 2520/105; B60W 2552/00; B60W 2554/4041;
(Continued)

(56) References Cited

U.S. PATENT DOCUMENTS

| 5,999,874 A | 12/1999 | Winner et al. |
| 2007/0083309 A1* | 4/2007 | Danner .............. B60K 31/0008 701/41 |

(Continued)

FOREIGN PATENT DOCUMENTS

| CN | 106240568 | 12/2016 | |
| JP | H-01202538 A * | 2/1988 | ............. B60K 31/00 |

(Continued)

OTHER PUBLICATIONS

Translation of JPH-01202538-A retrieved from Google Patents on May 28, 2024 (Year: 2024).*

(Continued)

*Primary Examiner* — Thomas Ingram
*Assistant Examiner* — Faris Asim Shaikh

(57) ABSTRACT

This driving support device outputs a target acceleration/deceleration for causing a host vehicle to track a preceding vehicle, if there is a preceding vehicle to track, and if there is no preceding vehicle to track, outputs a target acceleration for bringing the speed of the host vehicle to a set fixed speed, and modifies (corrects) the target acceleration in accordance with the lane width.

4 Claims, 4 Drawing Sheets

(52) U.S. Cl.
CPC ............... *B60W 2554/4041* (2020.02); *B60W 2554/802* (2020.02); *B60W 2554/804* (2020.02); *B60W 2720/106* (2013.01)

(58) Field of Classification Search
CPC ..... B60W 2554/802; B60W 2554/804; B60W 2720/106; B60W 30/14; B60W 30/12; B60W 2520/10; B60W 2720/10; B60W 2720/103; B60W 30/10; B60W 2554/801; B60W 2754/20; B60K 31/00; G08G 1/16; B60T 2201/081; B60T 2201/087; B60T 2201/089; G05D 1/646; G06V 20/588; G06T 2207/30256; B60L 2240/12; B60L 2240/14; B60L 2240/16; B60L 2240/18; B60L 2240/32
See application file for complete search history.

(56) References Cited

U.S. PATENT DOCUMENTS

| | | | |
|---|---|---|---|
| 2007/0198162 A1* | 8/2007 | Kubota | B60W 30/165 |
| | | | 701/96 |
| 2008/0314666 A1* | 12/2008 | Inou | B60K 31/00 |
| | | | 180/170 |
| 2016/0362106 A1 | 12/2016 | Maeda et al. | |
| 2017/0066443 A1 | 3/2017 | Kobayashi et al. | |
| 2017/0166204 A1* | 6/2017 | Yoo | G08G 1/16 |
| 2018/0037227 A1* | 2/2018 | D'sa | B60W 30/16 |
| 2018/0181820 A1* | 6/2018 | Ide | G08G 1/167 |
| 2019/0270447 A1* | 9/2019 | Tsuchiya | G08G 1/165 |
| 2019/0359215 A1* | 11/2019 | Shimakage | B60W 30/16 |
| 2021/0155235 A1* | 5/2021 | Yang | B60W 50/14 |
| 2021/0269062 A1* | 9/2021 | Yasutomi | G06T 7/50 |
| 2021/0347359 A1 | 11/2021 | Nakatsuji et al. | |

FOREIGN PATENT DOCUMENTS

| | | | |
|---|---|---|---|
| JP | 01-202538 | 8/1989 | |
| JP | 07-017295 | 1/1995 | |
| JP | 10-95246 | 4/1998 | |
| JP | 2004-094733 | 3/2004 | |
| JP | 2006-182258 | 7/2006 | |
| JP | 2007-186097 | 7/2007 | |
| JP | 6599037 | 10/2019 | |
| WO | WO-2013159954 A1 * | 10/2013 | ............ B60W 30/12 |

OTHER PUBLICATIONS

Translation of WO 2013159954 A1 retrieved from Espacenet on Dec. 16, 2024 (Year: 2024).*

* cited by examiner

DRIVING SUPPORT METHOD, AND DRIVING SUPPORT DEVICE

TECHNICAL FIELD

The present disclosure relates to a driving assistance method of assisting the driving of a vehicle and a driving assistance apparatus that assists the driving of the vehicle.

BACKGROUND ART

In recent years, as one technology of assisting the driving of a vehicle, adaptive cruise control (hereinafter referred to as "ACC") has been gathering attention (for example, see Patent Literature (hereinafter, referred to as PTL 1)). The ACC is a technology of obtaining the vehicle speed of a vehicle, the relative speed of a leading vehicle with respect to the vehicle, the inter-vehicle distance between the vehicle and the leading vehicle, and the like, and controlling a driving system and a braking system of the vehicle such that the vehicle speed and the inter-vehicle distance between the vehicle and the leading vehicle are maintained to be constant.

Another technology of assisting the driving of the vehicle is cruise control (hereinafter, referred to as "CC") (for example, see Patent Literature (hereinafter, referred to as PTL) 2). The CC is a technology of detecting a difference between a vehicle speed set by a driver and the actual vehicle speed and controlling the engine output and the gear stage (gear ratio) of a transmission on the basis of the speed difference, to thereby control the actual vehicle speed to converge to the set vehicle speed. In other words, the CC is a technology of maintaining the speed of own car at a set certain speed even when the driver does not step on an accelerator pedal.

In general, in a vehicle in which an ACC function is installed, a CC function is also installed as a part of the ACC function. The CC function is executed when a leading car is not present, for example.

CITATION LIST

Patent Literature

PTL 1
Japanese Patent Application Laid-Open No. HEI 7-17295
PTL 2
Japanese Patent Application Laid-Open No. HEI 1-202538

SUMMARY OF INVENTION

Technical Problem

The present disclosure provides a driving assistance method and a driving assistance apparatus capable of reducing a feeling of pressure against a driver due to acceleration without reducing the followability with respect to a leading car in a vehicle having both of an ACC function and a CC function.

Solution to Problem

One aspect of a driving assistance method of the present disclosure is a method of assisting driving of a vehicle, the driving assistance method comprising:
 a leading-car determination step of determining whether there is a leading car to be followed by own car;
 a lane-width detection step of detecting a lane width for the own car that is traveling; and
 a target-control-value output step of outputting a target acceleration/deceleration speed or a target acceleration speed of the own car for performing automatic traveling, wherein the target-control-value output step includes:
 outputting, when a determination result indicating that there is a leading car to be followed is obtained in the leading-car determination step, the target acceleration/deceleration speed for causing the own car to follow the leading car on a basis of a relative speed and an inter-vehicle distance between the own car and the leading car; and
 outputting, when a determination result indicating that there are not leading cars to be followed is obtained in the leading-car determination step and a speed of the own car is smaller than a set speed, the target acceleration speed for causing the speed of the own car to be a set certain speed and changing the target acceleration speed in accordance with the lane width obtained in the lane-width detection step.

One aspect of a driving assistance apparatus of the present disclosure is an apparatus that assists driving of a vehicle, the driving assistance apparatus comprising:
 a leading-car determination section that determines whether there is a leading car to be followed by own car;
 a lane-width detection section that detects a lane width for the own car that is traveling; and
 a target-control-value output section that outputs a target acceleration/deceleration speed or a target acceleration speed of the own car for performing automatic traveling, wherein the target-control-value output section:
 outputs, when a determination result indicating that there is a leading car to be followed is obtained by the leading-car determination section, the target acceleration/deceleration speed for causing the own car to follow the leading car on a basis of a relative speed and an inter-vehicle distance between the own car and the leading car; and
 outputs, when a determination result indicating that there are no leading cars to be followed is obtained by the leading-car determination section and a speed of the own car is smaller than a set speed, the target acceleration speed for causing the speed of the own car to be a set certain speed and changes the target acceleration speed in accordance with the lane width obtained by the lane-width detection section.

Advantageous Effects of Invention

According to the present disclosure, the target acceleration speed is changed in accordance with the lane width when a leading car to be followed is not present, and hence the feeling of pressure against the driver due to acceleration when transition to the constant speed traveling is made is reducible without reducing the followability with respect to the leading car in the vehicle having both of the ACC function and the CC function.

DESCRIPTION OF EMBODIMENTS

One embodiment of the present invention is described in detail below with reference to the accompanying drawings.

<1> Configuration of Vehicle

First, the configuration of a vehicle including a driving assistance apparatus according to one embodiment of the present disclosure is described.

Figure 1:
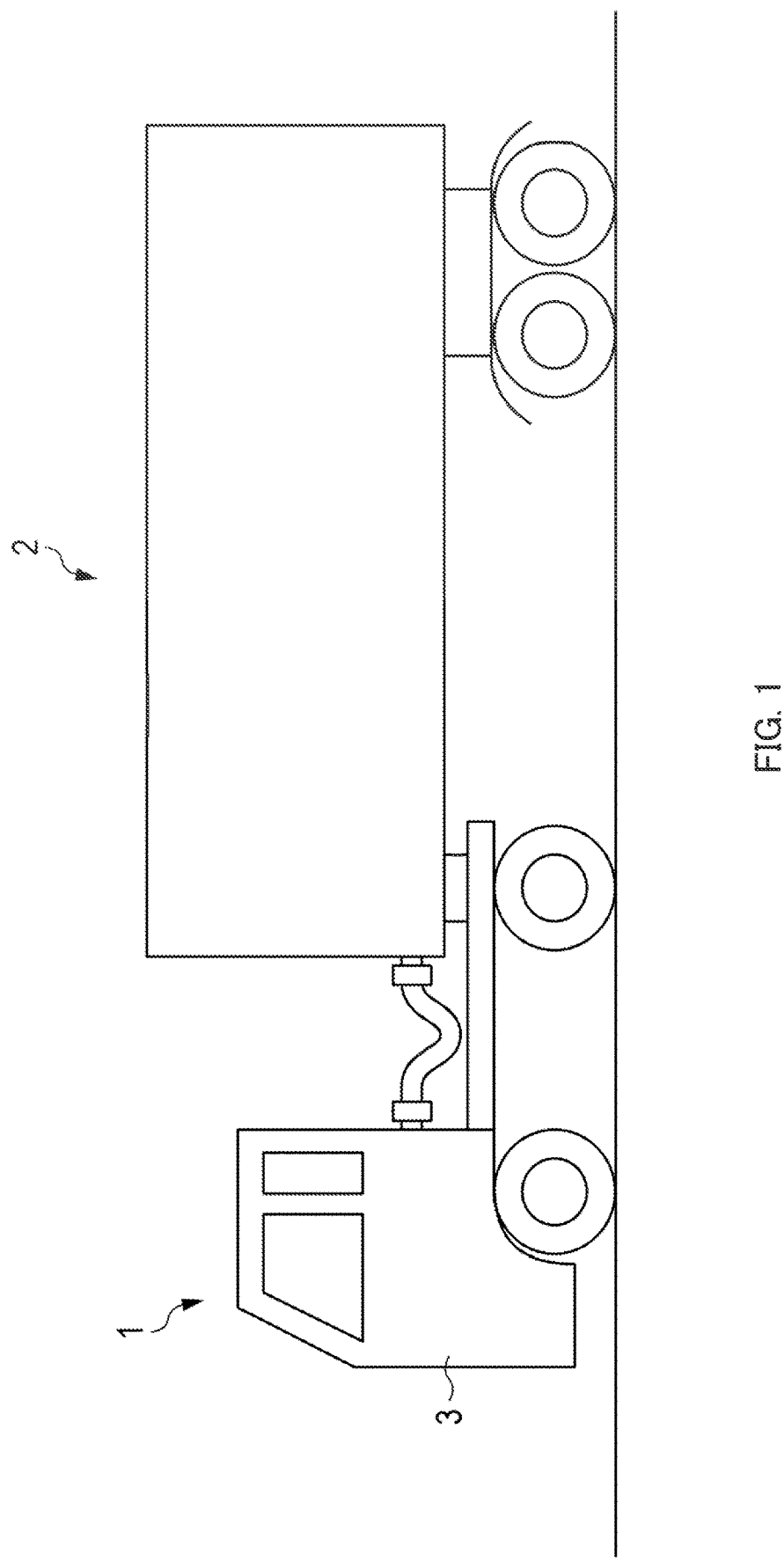
FIG. 1 is an external view illustrating an example of a vehicle to which a driving assistance apparatus according to an embodiment is applied.
Figure 2:
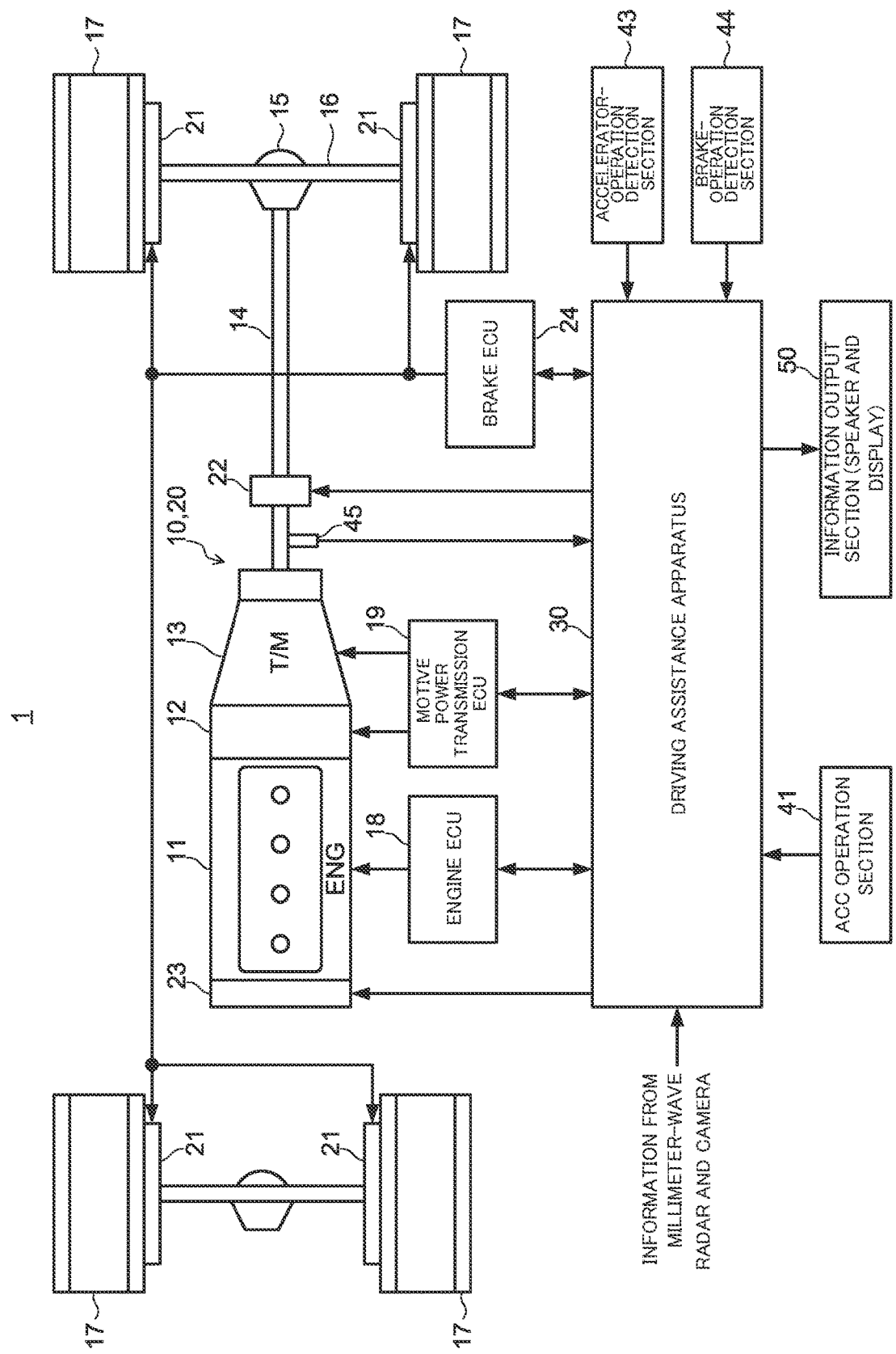
FIG. 2 is a block diagram illustrating the configuration of the vehicle of the embodiment.

FIG. 1 is an external view illustrating an example of vehicle 1 to which a driving assistance apparatus according to the present embodiment is applied. FIG. 2 is a block diagram illustrating the configuration of vehicle 1. Illustration and description are made by focusing on parts relating to the driving assistance apparatus.

As illustrated in FIG. 1, vehicle 1 is a tractor (traction vehicle) capable of towing trailer 2 as a result of coupling trailer 2 to the tractor. Vehicle 1 has vehicle main-body portion 3 including a power system such as an engine and driving wheels and a driver's seat, and trailer 2 coupled to vehicle main-body portion 3.

As illustrated in FIG. 2, vehicle 1 has driving system 10 that causes vehicle 1 to travel, braking system 20 that decelerates vehicle 1, driving assistance apparatus 30 that assists the driving of vehicle 1 by a driver, and the like.

Driving system 10 has engine 11, clutch 12, transmission 13, propeller shaft 14, differential gear 15, drive shaft 16, wheels 17, engine ECU 18, and motive power transmission ECU 19.

Engine ECU 18 and motive power transmission ECU 19 are connected to driving assistance apparatus 30 by an in-vehicle network such as a controller area network (CAN) and are able to transmit and receive necessary data and control signals to and from each other. Engine ECU 18 controls the output of engine 11 in accordance with a drive command from driving assistance apparatus 30. Motive power transmission ECU 19 controls the connection and disconnection of clutch 12 and the speed change of transmission 13 in accordance with a drive command from driving assistance apparatus 30.

The motive power of engine 11 is transmitted to transmission 13 via clutch 12. The motive power transmitted to transmission 13 is further transmitted to wheels 17 via propeller shaft 14, differential gear 15, and drive shaft 16. As a result, the motive power of engine 11 is transmitted to wheels 17, and vehicle 1 travels.

Braking system 20 has service brakes 21, auxiliary brakes 22, 23, a parking brake (not shown), and brake ECU 24.

Service brake 21 is a brake that is generally referred to as a main brake, a friction brake, a foot brake, a foundation brake, or the like. Service brake 21 is a drum brake that obtains braking force by pressing a brake lining against the inner side of a drum that rotates with wheel 17, for example.

Auxiliary brake 22 is a retarder (hereinafter referred to as "retarder 22") that obtains braking force by directly giving load to the rotation of propeller shaft 14, and is an electromagnetic retarder, for example. Auxiliary brake 23 is an exhaust brake (hereinafter referred to as "exhaust brake 23") that increases an effect of an engine brake with use of rotational resistance of the engine. By providing retarder 22 and exhaust brake 23, the braking force can be increased, and the frequency of usage of service brakes 21 is reduced. Therefore, the wear-out of brake lining and the like can be suppressed.

Brake ECU 24 is connected to driving assistance apparatus 30 by an in-vehicle network such as a CAN and is able to transmit and receive necessary data and control signals to and from each other. Brake ECU 24 controls the braking force of service brakes 21 (the brake fluid pressure of wheel cylinders of wheels 17) in accordance with a braking command from driving assistance apparatus 30.

The braking operation of service brakes 21 is controlled by driving assistance apparatus 30 and brake ECU 24. The braking operation of retarder 22 and exhaust brake 23 is controlled by on/off by driving assistance apparatus 30. The braking force of retarder 22 and exhaust brake 23 is substantially fixed. Therefore, when a desired braking force is to be accurately generated, service brakes 21 that can fine-adjust the braking force are suitable.

Information from a millimeter-wave radar and a camera is input to driving assistance apparatus 30. Information from the millimeter-wave radar and the camera is information indicating the traffic situation and the road situation ahead of the vehicle. Driving assistance apparatus 30 has ACC operation section 41, accelerator-operation detection section 43, brake-operation detection section 44, and the like.

Driving assistance apparatus 30 forms control signals for controlling the operation of driving system 10 and braking system 20. In particular, driving assistance apparatus 30 of the present embodiment obtains a target acceleration/deceleration speed for realizing ACC and a target acceleration speed for realizing CC and outputs the target acceleration/deceleration speed and the target acceleration speed to engine ECU 18, motive power transmission ECU 19, and brake ECU 24, as appropriate.

The CC is actually realized as one function in the ACC, but the function of the CC may be described separately from the function of ACC in the present embodiment to make the description easier to understand.

Although not shown, each of engine ECU 18, motive power transmission ECU 19, brake ECU 24, and driving assistance apparatus 30 has a central processing unit (CPU), a storage medium such as a read only memory (ROM) in which a control program is stored, a working memory such as a random access memory (RAM), and a communication circuit, for example. In this case, for example, the functions of sections described below constituting driving assistance apparatus 30 are realized by executing control programs by the CPU. All or some of engine ECU 18, motive power transmission ECU 19, brake ECU 24, and driving assistance apparatus 30 may be integrated.

ACC operation section 41 includes an ACC ON/OFF switch for performing ON/OFF control of the operation of the ACC. ACC operation section 41 includes setting switches for setting various settings of the ACC and the CC. A driver can set a target inter-vehicle distance and a target own-vehicle speed, for example, by operating the setting switches. Those switches may be realized by a user interface displayed on a display with a touch screen.

Accelerator-operation detection section 43 detects the depression amount of an accelerator pedal and outputs the detection result to driving assistance apparatus 30. Driving assistance apparatus 30 transmits drive commands to engine ECU 18 and motive power transmission ECU 19 on the basis of the depression amount of the accelerator pedal.

Brake-operation detection section 44 detects the depression amount of a brake pedal for operating service brakes 21. Brake-operation detection section 44 detects whether an auxiliary brake lever that causes retarder 22 or exhaust brake 23 to operate has been operated. Brake-operation detection section 44 outputs the detection result relating to the brake pedal and the auxiliary brake lever to driving assistance apparatus 30. Driving assistance apparatus 30 transmits a braking command to brake ECU 24 on the basis of the depression amount of the brake pedal. Driving assistance apparatus 30 controls the ON/OFF operation of retarder 22 or exhaust brake 23 on the basis of the operation of the auxiliary brake lever.

Driving assistance apparatus 30 outputs various information relating to traveling from information output section 50.

<2> Configuration of Driving Assistance Apparatus

Figure 3:
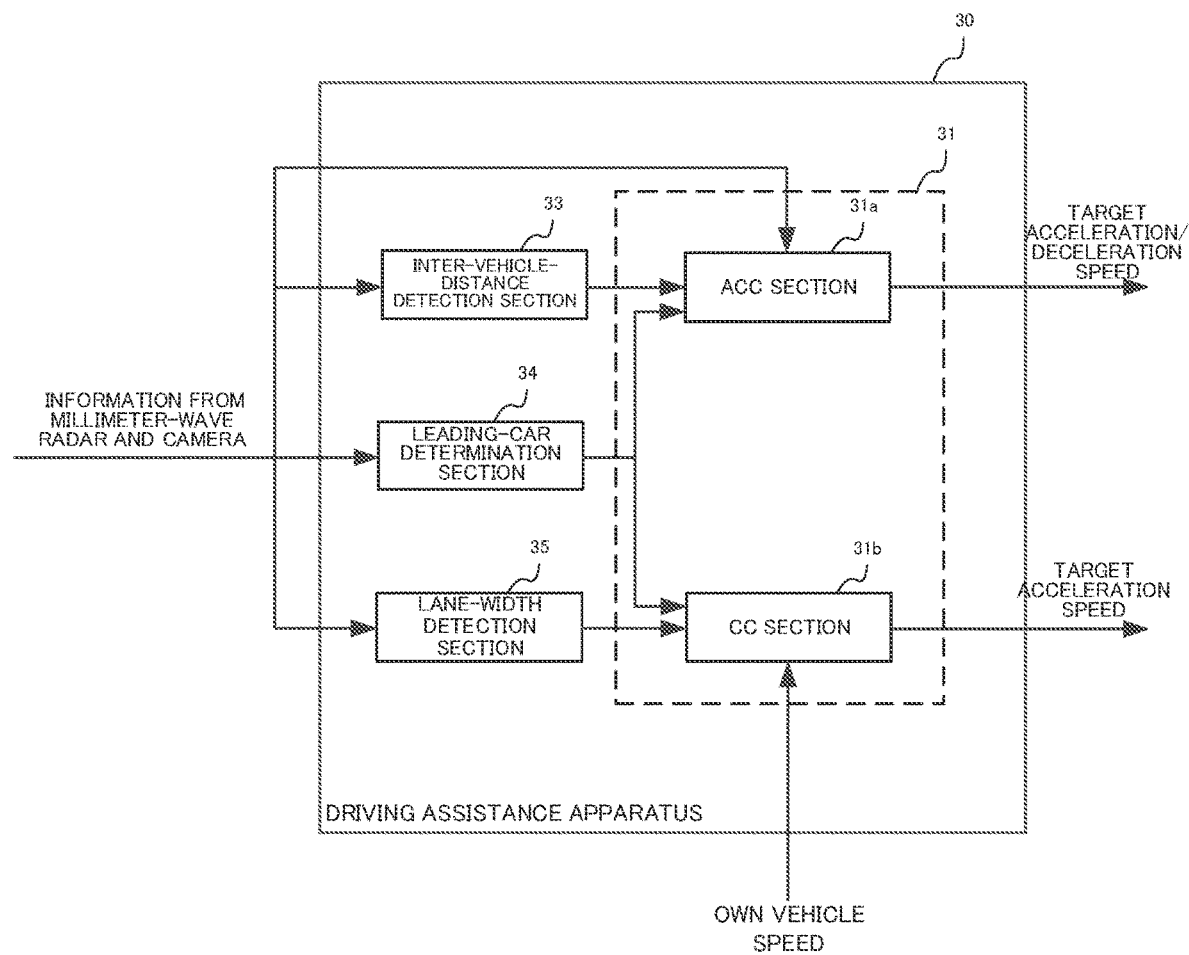
FIG. 3 is a block diagram illustrating the configuration of the driving assistance apparatus.

FIG. 3 is a block diagram illustrating the configuration of driving assistance apparatus of the present embodiment.

Driving assistance apparatus 30 has target-control-value output section 31, inter-vehicle-distance detection section 33, leading-car determination section 34, and lane-width detection section 35.

Target-control-value output section 31 has ACC section 31a and CC section 31b. As described above, the CC is actually realized as one function in the ACC, but the function of the CC is described separately from the function of ACC in the present embodiment to make the description easier to understand. In other words, ACC section 31a and CC section 31b may not actually be separated as in FIG. 3, and CC section 31b may be included in ACC section 31a.

ACC section 31a and CC section 31b basically execute known ACC processing and CC processing, respectively. In other words, ACC section 31a outputs a target acceleration/deceleration speed for causing own car to follow a leading car on the basis of the relative speed and the inter-vehicle distance between the own car and the leading car. As a result, automatic following control is realized. Meanwhile, CC section 31b outputs a target acceleration speed for causing the speed of the own car to be a set certain speed. As a result, constant-speed traveling control is realized.

Automatic-following traveling control is control that operates driving system 10 and braking system 20 such that the inter-vehicle distance is within a predetermined target range and the relative speed approaches zero when a leading vehicle is present in a predetermined range. The constant-speed traveling control is control that operates driving system 10 and braking system 20 such that the traveling speed of vehicle 1 approaches a predetermined target value when there are no leading vehicles in a predetermined range.

Inter-vehicle-distance detection section 33 measures (detects) the inter-vehicle distance between own vehicle 1 and the leading car on the basis of information on a place ahead of own vehicle 1 obtained by the millimeter-wave radar, camera, and the like, and outputs the measurement result to ACC section 31. Inter-vehicle-distance detection section 33 may measure the inter-vehicle distance on the basis of information from other sensors such as a laser radar.

Leading-car determination section 34 determines whether there is a leading car to be followed on the basis of information on the traffic situation ahead of own vehicle 1 obtained by the millimeter-wave radar, the camera, and the like. Specifically, when a vehicle is present ahead in the same lane as the own vehicle, it is determined that there is a leading car.

Lane-width detection section 35 detects the width of a traveling lane in which own car is traveling on the basis of information on the road situation ahead of own vehicle 1 obtained by the millimeter-wave radar, the camera, and the like. Specifically, the width of the traveling lane is detected by detecting a curb and the lane on the basis of an image obtained by the camera and obtaining the length therebetween.

<3> Traveling Control Operation of Driving Assistance Apparatus

Figure 4:
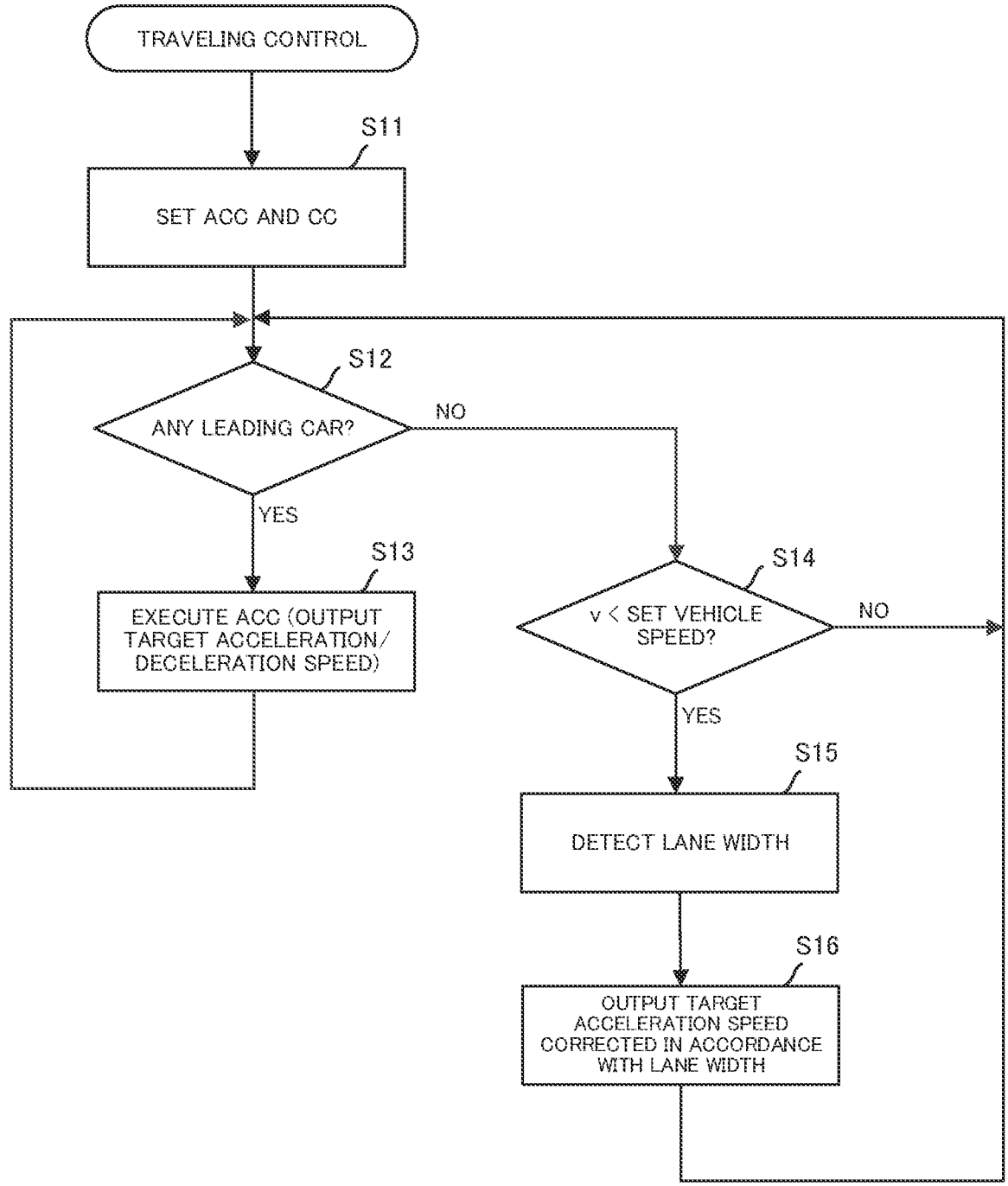
FIG. 4 is a flowchart provided for the description of a traveling control operation of the driving assistance apparatus.

Next, a traveling control operation of driving assistance apparatus 30 is described. FIG. 4 is a flowchart provided for the description of the traveling control operation of driving assistance apparatus 30.

First, driving assistance apparatus 30 proceeds to Step S12 when the setting of the ACC and the CC is performed (for example, when ON operation is performed for the ACC and the CC) by a driver in Step S11. In Step S12, leading-car determination section 34 determines whether there is a leading car. The processing transitions to Step S13 when there is a leading car and transitions to Step S14 when there are no leading cars.

In Step S13, the ACC is executed by ACC section 31a of target-control-value output section 31. Specifically, in Step S13, ACC section 31a outputs the target acceleration/deceleration speed for causing the own car to follow the leading car with use of information on the inter-vehicle distance between the own car and the leading car input from inter-vehicle-distance detection section 33 and information on the relative speed with respect to the leading car obtained from information from the millimeter-wave radar and the camera. The target acceleration/deceleration speed is transmitted to engine ECU 18, motive power transmission ECU 19, and brake ECU 24, as appropriate.

In Steps S14, S15, and S16, the CC of target-control-value output section 31 is executed. Specifically, first, in Step S14, CC section 31b determines whether current own vehicle speed v is smaller than a set speed (target speed) that is preset, and the processing proceeds to Step S15 when own vehicle speed v is smaller than the set speed (target speed) (Step S14; YES) and returns to Step S12 otherwise (Step S14; NO).

In Step S15, the lane width for the own car that is traveling is detected by lane-width detection section 35. The detection of the lane width by lane-width detection section may naturally be executed in a constant manner.

In following Step S16, the target acceleration speed in accordance with the lane width is output by CC section 31b. Specifically, first, information on the own vehicle speed from a vehicle speed sensor (not shown) is input to CC section 31b. CC section 31b calculates the difference between the own vehicle speed and a target own vehicle speed set by ACC operation section 41 and obtains a target acceleration speed in accordance with the difference. The target acceleration speed is obtained by referring to a table, for example.

CC section 31b of the present embodiment changes (corrects) the obtained target acceleration speed in accordance with the lane width detected by lane-width detection section 35. Specifically, CC section 31b changes (corrects) the target acceleration speed to be smaller as the lane width becomes narrower. The changed (corrected) target acceleration speed is transmitted to engine ECU 18 and motive power transmission ECU 19.

<4> Effects of Embodiment

As described above, according to the present embodiment, the target acceleration/deceleration speed for causing the own car to follow the leading car is output when there is a leading car to be followed, and the target acceleration speed for causing the speed of the own car to be a set certain speed is output and the target acceleration speed is changed (corrected) in accordance with the lane width when there are no leading cars to be followed.

As a result, when there is a leading car to be followed, the following control that does not reduce the responsiveness of the following with respect to the leading car is maintained. Meanwhile, when there are no leading cars to be followed, the acceleration speed is controlled in accordance with the lane width. Therefore, in the vehicle having both of the ACC function and the CC function, autonomous driving that does not cause the driver to feel burdened or uneasy can be realized in various driving environments.

In other words, it can be said that the target acceleration/deceleration speed for following the leading car is independent of the lane width, and the target acceleration speed for performing constant speed traveling is dependent on the lane width in the driving assistance method of the present embodiment.

In the ACC, control that causes the vehicle speed to approach the set vehicle speed, for example, is performed (in other words, the CC is executed) when a leading vehicle disappears, but a feeling of pressure may be felt when a sudden acceleration is performed in a road environment in which the road width is narrow. In particular, in a large car such as a truck, a sudden acceleration at a narrow road width not only makes the driver feel a feeling of pressure but also gives the feeling of pressure to surrounding people such as a pedestrian at a high possibility.

In the present embodiment, when the road width is narrow, the acceleration speed for reaching the set vehicle speed is corrected to be smaller than a basic acceleration speed. Therefore, the feeling of pressure against the driver and surrounding people such as a pedestrian due to the acceleration when transition to the constant speed traveling is made can be reduced. Thus, the autonomous driving that can reduce the feeling of pressure against the driver due to acceleration when transition to the constant speed traveling is made without reducing the followability with respect to the leading car may be realized in the vehicle having both of the ACC function and the CC function.

<5> Other Embodiments

The abovementioned embodiment is merely an example of a realization for carrying out the present invention, and the interpretation of the technical scope of the present invention is not to be limited by those embodiments. In other words, the present invention can be carried out in various forms without departing from the gist or the main features of the present invention.

<5-1> In the abovementioned embodiment, a case where the target acceleration speed is changed to be smaller (in other words, attenuation correction is performed on the target acceleration speed) as the lane width becomes narrower is described. However, the correction amount of the target acceleration speed in accordance with the deviation between the set vehicle speed and the own vehicle speed may be changed. Specifically, the attenuation amount (correction amount) of the target acceleration speed becomes smaller as the difference between the set vehicle speed and the own vehicle speed becomes smaller. In this way, it is possible to avoid an inconvenience in which the set vehicle speed cannot be achieved when the own vehicle speed approaches the set vehicle speed due to continuation of the attenuation correction, for example.

<5-2> In addition to the abovementioned embodiment, correction may be performed such that the acceleration speed becomes lower as the ratio of the vehicle width to the lane width (the vehicle width÷ the width of the lane) becomes greater. In this way, control with less feeling of pressure that also takes the vehicle width into consideration can be realized.

<5-3> In addition to the abovementioned embodiment, the attenuation amount of the target acceleration speed may be the maximum attenuation amount when the lane width cannot be detected.

<5-4> In the present embodiment, a case where vehicle 1 to which the driving assistance apparatus and method of the present invention are applied is a tractor capable of towing trailer 2 by coupling trailer 2 to the tractor is described. However, the vehicle to which the present invention is applicable is not limited thereto and may be a vehicle such as a passenger car.

The present application is based on Japanese Patent Application (Japanese Patent Application No. 2020-033738) filed on Feb. 28, 2020, the entire content of which is incorporated herein by reference.

INDUSTRIAL APPLICABILITY

The driving assistance apparatus and the driving assistance method of the present disclosure are suitable for use as a driving assistance apparatus and a driving assistance method capable of reducing a feeling of pressure against a driver due to acceleration without reducing the followability with respect to a leading car in a vehicle having both of an ACC function and a CC function.

REFERENCE SIGNS LIST

1 Vehicle
2 Trailer
3 Vehicle main-body portion
10 Driving system
11 Engine
12 Clutch
13 Transmission
14 Propeller shaft
15 Differential gear
16 Drive shaft
17 Wheel
18 Engine ECU
19 Motive power transmission ECU
20 Braking system
21 Service brake
22 Retarder
23 Exhaust brake
24 Brake ECU
30 Driving assistance apparatus
31 Target-control-value output section
31a ACC section
31b CC section
33 Inter-vehicle-distance detection section
34 Leading-car determination section
35 Lane-width detection section
41 ACC operation section 43 Accelerator-operation detection section
44 Brake-operation detection section
50 Information output section

The invention claimed is:

1. A driving assistance method of assisting driving of a car, the driving assistance method comprising:
   a leading-car determination step of determining whether there is a leading car to be followed by own car;
   a lane-width detection step of detecting a lane width for the own car that is traveling; and
   a target-control-value output step of outputting a target acceleration/deceleration speed or a target acceleration speed of the own car for performing automatic traveling, wherein the target-control-value output step includes:
   outputting, when a determination result indicating that there is a leading car to be followed is obtained leading-car determination step, the target acceleration/deceleration speed for causing the own car to follow the leading car on a basis of a relative speed and an inter-car distance between the own car and the leading car; and
   outputting, when a determination result indicating that there are not leading cars to be followed is obtained in the leading-car determination step and a speed of the own car is smaller than a set speed, the target acceleration speed for causing the speed of the own car to be a set certain speed and correcting the target acceleration speed to be output based on a ratio between the lane width obtained in the lane-width detection step and a car width of the own car.

2. The driving assistance method according to claim 1, wherein in the target-control-value output step, correcting the target acceleration speed so that the target acceleration speed is smaller as the value obtained by dividing the car width by the lane width is larger.

3. A driving assistance apparatus that assists driving of a car, the driving assistance apparatus comprising:
   a leading-car determination section that determines whether there is a leading car to be followed by own car;
   a lane-width detection section that detects a lane width for the own car that is traveling; and
   a target-control-value output section that outputs a target acceleration/deceleration speed or a target acceleration speed of the own car for performing automatic traveling, wherein the target-control-value output section:
   outputs, when a determination result indicating that there is a leading car to be followed is s obtained by the leading-car determination section, the target acceleration/deceleration speed for causing the own car to follow the leading car on a basis of a relative speed and an inter-car distance between the own car and the leading car; and
   outputs, when a determination result indicating that there are no leading cars to be followed is obtained by the leading-car determination section and a speed of the own car is smaller than a set speed, the target acceleration speed for causing the speed of the own car to be a set certain speed and corrects the target acceleration speed to be output based on a ratio between the lane width obtained in the lane-width detection step and a car width of the own car.

4. The driving apparatus according to claim 3, wherein the target-control-value output section that corrects the target acceleration speed so that the target acceleration speed is smaller as the value obtained by dividing the car width by the lane width is larger.

* * * * *